(12) United States Patent
Tsubaki et al.

(10) Patent No.: US 11,546,545 B2
(45) Date of Patent: Jan. 3, 2023

(54) VIDEO MANAGEMENT APPARATUS, VIDEO MANAGEMENT METHOD AND PROGRAM

(71) Applicant: NIPPON TELEGRAPH AND TELEPHONE CORPORATION, Tokyo (JP)

(72) Inventors: Takuma Tsubaki, Musashino (JP); Naoki Higo, Musashino (JP); Kojun Koshiji, Musashino (JP); Toshimitsu Tsubaki, Musashino (JP); Takeshi Kuwahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/284,139

(22) PCT Filed: Oct. 1, 2019

(86) PCT No.: PCT/JP2019/038715
§ 371 (c)(1),
(2) Date: Apr. 9, 2021

(87) PCT Pub. No.: WO2020/080095
PCT Pub. Date: Apr. 23, 2020

(65) Prior Publication Data
US 2021/0337161 A1 Oct. 28, 2021

(30) Foreign Application Priority Data
Oct. 15, 2018 (JP) .............................. JP2018-194147

(51) Int. Cl.
*H04N 5/765* (2006.01)
*G06F 16/75* (2019.01)
*H04N 5/91* (2006.01)

(52) U.S. Cl.
CPC ............. *H04N 5/765* (2013.01); *G06F 16/75* (2019.01); *H04N 5/91* (2013.01)

(58) Field of Classification Search
CPC . H04N 5/765; H04N 5/91; H04N 7/18; G06F 16/75
See application file for complete search history.

(56) References Cited

U.S. PATENT DOCUMENTS

2014/0071290 A1* 3/2014 Collen ..................... H04N 5/76
348/207.1
2016/0140131 A1* 5/2016 Chen ..................... G06F 16/113
707/667

FOREIGN PATENT DOCUMENTS

| JP | 2008-165701 | 7/2008 |
| JP | 201092287 | * 10/2008 |
| JP | 2010-092287 | 4/2010 |

OTHER PUBLICATIONS

Kimming So and Rudolph N. Rechtschaffen, "Cache Operations by MRU Change," IEEE Transactions on Computers. vol. 31. No. 6, pp. 700-709, 1988.

(Continued)

*Primary Examiner* — Yassin Alata
(74) *Attorney, Agent, or Firm* — IPUSA, PLLC

(57) ABSTRACT

A video management device includes a storage processing unit configured to store video data received through a network in a storage unit, a calculation unit configured to classify a video data group stored in the storage unit based on combinations of imaging locations and content of video data, and to calculate a frequency of appearance of each of the combinations, and a selection unit configured to select video data to be deleted from the storage unit based on the frequency of appearance, thereby increasing a possibility that the deletion of a high-value video will be avoided.

7 Claims, 13 Drawing Sheets

(56) References Cited

OTHER PUBLICATIONS

John T. Robinson, Murthy V. Devarakonda, "Data Cache Management Using Frequency-Based Replacement," SIGMETRICS '90 Proceedings of the 1990 ACM SIGMETRICS conference on Measurement and modeling of computer systems, pp. 134-142, 1990.

* cited by examiner

| STATIC INFORMATION AND DYNAMIC INFORMATION | USE (VIEWING/ANALYSIS) |
|---|---|
| STATION, FACE (BLACKLIST) | VIEWING |
| STATION, FACE | ANALYSIS |
| CONVENIENCE STORE, MAN \| WOMAN, PURCHASE \| NO PURCHASE | ANALYSIS |
| : | : |

| CAMERA ID | VIDEO ID | DETECTION TIME | STORAGE STARTING TIME | STORAGE TERMINATION TIME | METADATA |
|---|---|---|---|---|---|
| CAMERA B | B1 | 20180721103011 | 20180721103007 | 20180721103015 | STATION, FACE (BLACKLIST), VIEWING |
| CAMERA A | A1 | 20180721103011 | 20180721103001 | 20180721103021 | CONVENIENCE STORE, WOMAN, NO PURCHASE, ANALYSIS |
| CAMERA A | A2 | 20180721103014 | 20180721103010 | 20180721103018 | CONVENIENCE STORE, MAN, PURCHASE, ANALYSIS |
| : | : | : | : | : | : |
| CAMERA B | B100 | 20180730082112 | 20180730082102 | 20180730082122 | STATION, FACE, ANALYSIS |

Fig. 8

| COMBINATION OF METADATA | FREQUENCY OF APPEARANCE | VIDEO VALUE |
|---|---|---|
| STATION, FACE (BLACKLIST), VIEWING | 1 | |
| STATION, FACE, VIEWING | 99 | |
| CONVENIENCE STORE, WOMAN, NOT PURCHASED, ANALYSIS | 10 | |
| CONVENIENCE STORE, MAN, NOT PURCHASED, ANALYSIS | 25 | |
| CONVENIENCE STORE, WOMAN, PURCHASED, ANALYSIS | 40 | |
| CONVENIENCE STORE, MAN, PURCHASED, ANALYSIS | 25 | |

| COMBINATION OF METADATA | FREQUENCY OF APPEARANCE | VIDEO VALUE |
|---|---|---|
| STATION, FACE (BLACKLIST), VIEWING | 1 | 1 |
| STATION, FACE, VIEWING | 99 | 0.01 |
| CONVENIENCE STORE, WOMAN, NOT PURCHASED, ANALYSIS | 10 | 0.1 |
| CONVENIENCE STORE, MAN, NOT PURCHASED, ANALYSIS | 25 | 0.04 |
| CONVENIENCE STORE, WOMAN, PURCHASED, ANALYSIS | 40 | 0.025 |
| CONVENIENCE STORE, MAN, PURCHASED, ANALYSIS | 25 | 0.04 |

Fig. 11

| STATIC INFORMATION AND DYNAMIC INFORMATION | USE (VIEWING/ANALYSIS) | MONETARY COST FOR USING ONE PIECE OF VIDEO DATA |
|---|---|---|
| STATION, FACE (BLACKLIST) | VIEWING | 1000 |
| STATION, FACE | ANALYSIS | 10 |
| CONVENIENCE STORE, MAN \| WOMAN, PURCHASE \| NO PURCHASE | ANALYSIS | 50 |
| ⋮ | ⋮ | ⋮ |

Fig. 13

| CAMERA ID | VIDEO ID | DETECTION TIME | STORAGE STARTING TIME | STORAGE TERMINATION TIME | METADATA |
|---|---|---|---|---|---|
| CAMERA B | B1 | 20180721103011 | 20180721110307 | 20180721103015 | STATION, FACE (BLACKLIST), VIEWING, 1000 |
| CAMERA A | A1 | 20180721103011 | 20180721103001 | 20180721103021 | CONVENIENCE STORE, WOMAN, NO PURCHASE, ANALYSIS, 50 |
| CAMERA A | A2 | 20180721103014 | 20180721103010 | 20180721103018 | CONVENIENCE STORE, MAN, PURCHASE, ANALYSIS, 50 |
| .. | .. | .. | .. | .. | .. |
| CAMERA B | B100 | 20180730082112 | 20180730082102 | 20180730082122 | STATION, FACE, ANALYSIS, 10 |

| COMBINATION OF METADATA | FREQUENCY OF APPEARANCE | VIDEO VALUE |
|---|---|---|
| STATION, FACE (BLACKLIST), VIEWING, 1000 | 1 | 0.0010 |
| STATION, FACE, VIEWING, 10 | 99 | 0.0010 |
| CONVENIENCE STORE, WOMAN, NOT PURCHASED, ANALYSIS, 50 | 10 | 0.00200 |
| CONVENIENCE STORE, MAN, NOT PURCHASED, ANALYSIS, 50 | 25 | 0.00080 |
| CONVENIENCE STORE, WOMAN, PURCHASE, ANALYSIS, 50 | 40 | 0.00005 |
| CONVENIENCE STORE, MAN, PURCHASE, ANALYSIS, 50 | 25 | 0.00080 |

VIDEO MANAGEMENT APPARATUS, VIDEO MANAGEMENT METHOD AND PROGRAM

TECHNICAL FIELD

The present disclosure relates to a video management device, a video management method, and a program.

BACKGROUND ART

As video Internet of Things (IoT) becomes widespread, monitoring cameras are being disposed for various purposes such as crime prevention in stores and ecological records of animals, and video files generated by the monitoring cameras are stored in storages through a network for a long period of time, whereby it is possible to view and analyze videos at remote locations.

When a video is recorded for 24 hours by a monitoring camera, the amount of data becomes enormous, and it is not possible to easily extract a necessary video. In response to this, a monitoring camera that responds to only a moving object using a "moving object detection" function, acquires only necessary video data by performing imaging for a fixed period of time, and suppresses the amount of data has already been manufactured.

Even when the amount of data is suppressed using the "moving object detection" function, a storage capacity is limited, and thus new video files may not be able to be stored due to insufficient capacity as the operation thereof continues. For this reason, it is necessary to delete unnecessary video files in accordance with a trigger to secure a required storage capacity.

FIG. 1 is a diagram illustrating an example in which video data generated by monitoring cameras having a "moving object detection" function is stored in a storage through a network. In FIG. 1, when an individual monitoring camera detects an object, the monitoring camera images the object for a fixed period of time to generate a video file (S1). The monitoring cameras transmit the generated video files to the storage through a network (S2). As a result, the video files are stored in the storage (S3). Here, a storage capacity is limited, and thus it is necessary to delete unnecessary video files stored in the storage in accordance with a trigger (S4).

In the related art, a technique for adding a priority related to deletion to data on the basis of a time and a frequency and performing deletion from video data with a high priority (hereinafter referred to as "the related art") has been proposed.

CITATION LIST

Non Patent Literature

Non Patent Literature 1: KIMMING SO AND RUDOLPH N. RECHTSCHAFFEN, "Cache Operations by MRU Change," IEEE TRANSACTIONS ON COMPUTERS. VOL. 31. NO. 6, pp. 700-709, 1988

Non Patent Literature 2: John T. Robinson Murthy V. Devarakonda, "Data Cache Management Using Frequency-Based Replacement," SIGMETRICS '90 Proceedings of the 1990 ACM SIGMETRICS conference on Measurement and modeling of computer systems, pp. 134-142, 1990

SUMMARY OF THE INVENTION

Technical Problem

However, in the related art, the "value of a video" is not considered, and thus there is a problem in that high-value video data of which long-term storage is desired is deleted early.

The present disclosure is contrived in view of the above-described circumstances, and an object thereof is to increase a possibility that the deletion of a high-value video will be avoided.

Means for Solving the Problem

Consequently, in order to solve the above-described problems, a video management device includes a storage processing unit configured to store video data received through a network in a storage unit, a calculation unit configured to classify a video data group stored in the storage unit based on combinations of imaging locations and content of video data, and to calculate a frequency of appearance of each of the combinations, and a selection unit configured to select video data to be deleted from the storage unit based on the frequency of appearance.

Effects of the Invention

It is possible to increase a possibility that the deletion of a high-value video will be avoided.

BRIEF DESCRIPTION OF DRAWINGS

FIG. 8 is a diagram illustrating an example of a configuration of an assigned information storage unit 122 according to the first embodiment.

FIG. 11 is a diagram illustrating an example in which a video value is stored in the video value storage unit 124 according to the first embodiment.

FIG. 13 is a diagram illustrating an example of a configuration of a use table according to the second embodiment.

FIG. 14 is a diagram illustrating an example of a configuration of an assigned information storage unit 122 according to the second embodiment.

FIG. 15 is a diagram illustrating an example in which a video value is stored in a video value storage unit 124 according to the second embodiment.

DESCRIPTION OF EMBODIMENTS

Figure 1:
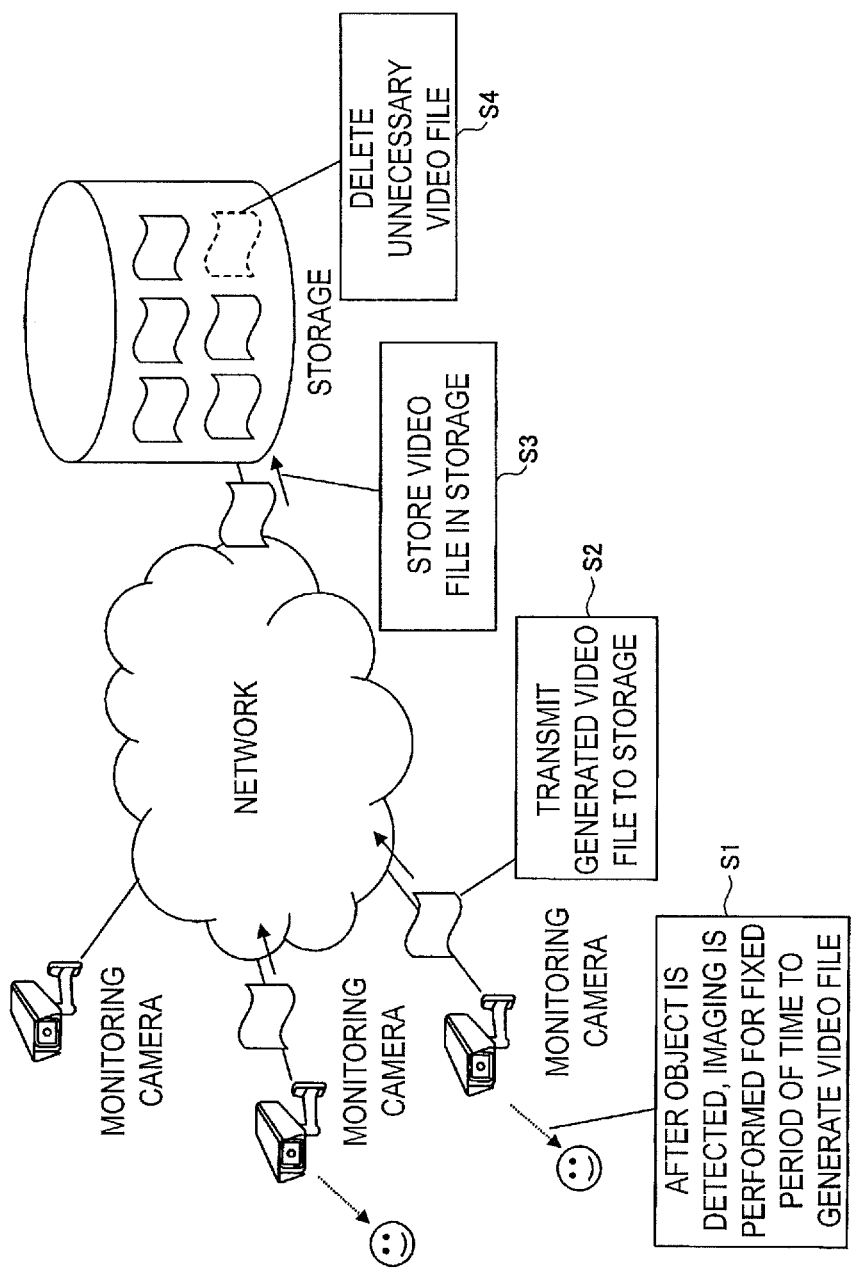
FIG. 1 is a diagram illustrating an example in which video data generated by monitoring cameras having a "moving object detection" function is stored in a storage through a network.
Figure 2:
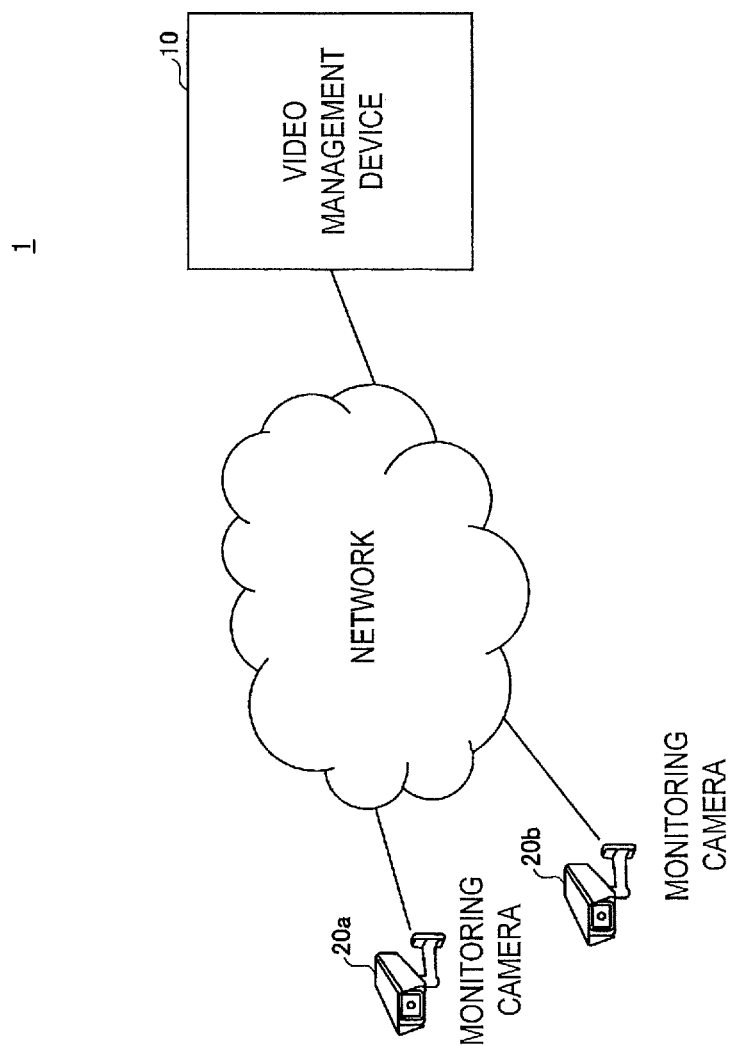
FIG. 2 is a diagram illustrating an example of a configuration of a video management system according to a first embodiment.

Hereinafter, embodiments of the present disclosure will be described with reference to the drawings. FIG. 2 is a diagram illustrating an example of a configuration of a video management system according to a first embodiment. A video management system 1 illustrated in FIG. 2 includes one or more monitoring cameras 20 such as a monitoring camera 20a and a monitoring camera 20b (hereinafter referred to simply as a "monitoring camera 20" in a case where the monitoring cameras are not distinguished from each other) and a video management device 10. The monitoring cameras 20 are connected to the video management device 10 through a network such as the Internet.

The monitoring cameras 20 are installed (fixed) at imaging locations corresponding to respective purposes for various purposes such as crime prevention in stores and ecological records of animals. The monitoring cameras 20 transmit data in which videos captured at the respective installation locations (imaging locations) are recorded (hereinafter referred to as "video data") to the video management device 10.

The video management device 10 stores the video data transmitted from the monitoring cameras 20. The stored video data is used for viewing, analysis, and the like.

Figure 3:
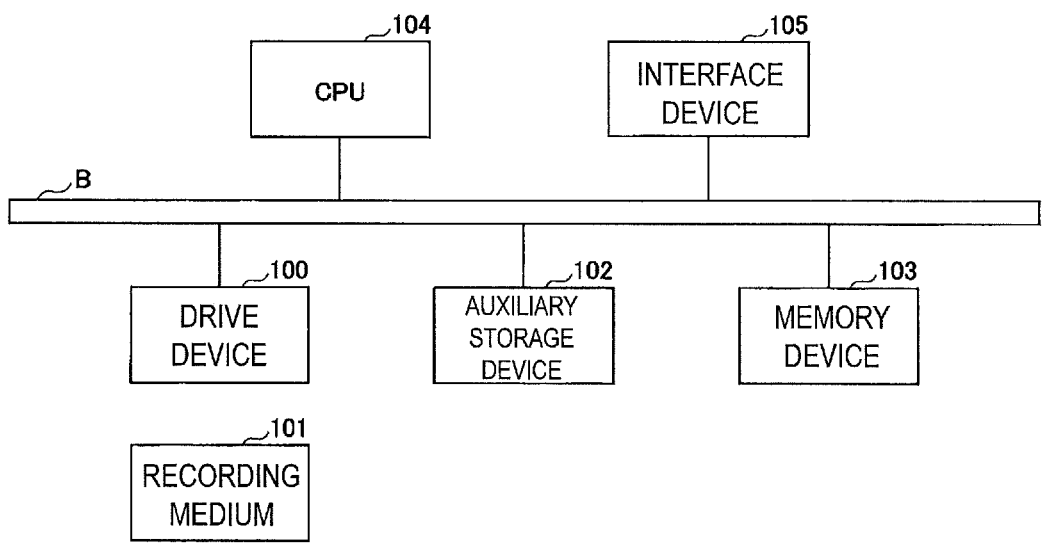
FIG. 3 is a diagram illustrating an example of a hardware configuration of a video management device 10 according to the first embodiment.

FIG. 3 is a diagram illustrating an example of a hardware configuration of the video management device 10 according to the first embodiment. As illustrated in FIG. 3, the video management device 10 includes a drive device 100, an auxiliary storage device 102, a memory device 103, a CPU 104, an interface device 105, and the like which are connected to each other by a bus B.

A program that realizes processing in the video management device 10 is provided on a recording medium 101 such as a CD-ROM. When the recording medium 101 storing the program is set in the drive device 100, the program is installed on the auxiliary storage device 102 from the recording medium 101 through the drive device 100. However, the installation of the program does not necessarily need to be performed from the recording medium 101, and the program may be downloaded from another computer through a network. The auxiliary storage device 102 stores the installed program and also stores necessary files, data, and the like.

The memory device 103 reads the program from the auxiliary storage device 102 and stores the program in a case where an instruction for starting the program is given. The CPU 104 executes a function related to the video management device 10 in accordance with the program stored in the memory device 103. The interface device 105 is used as an interface for connection to a network.

Figure 4:
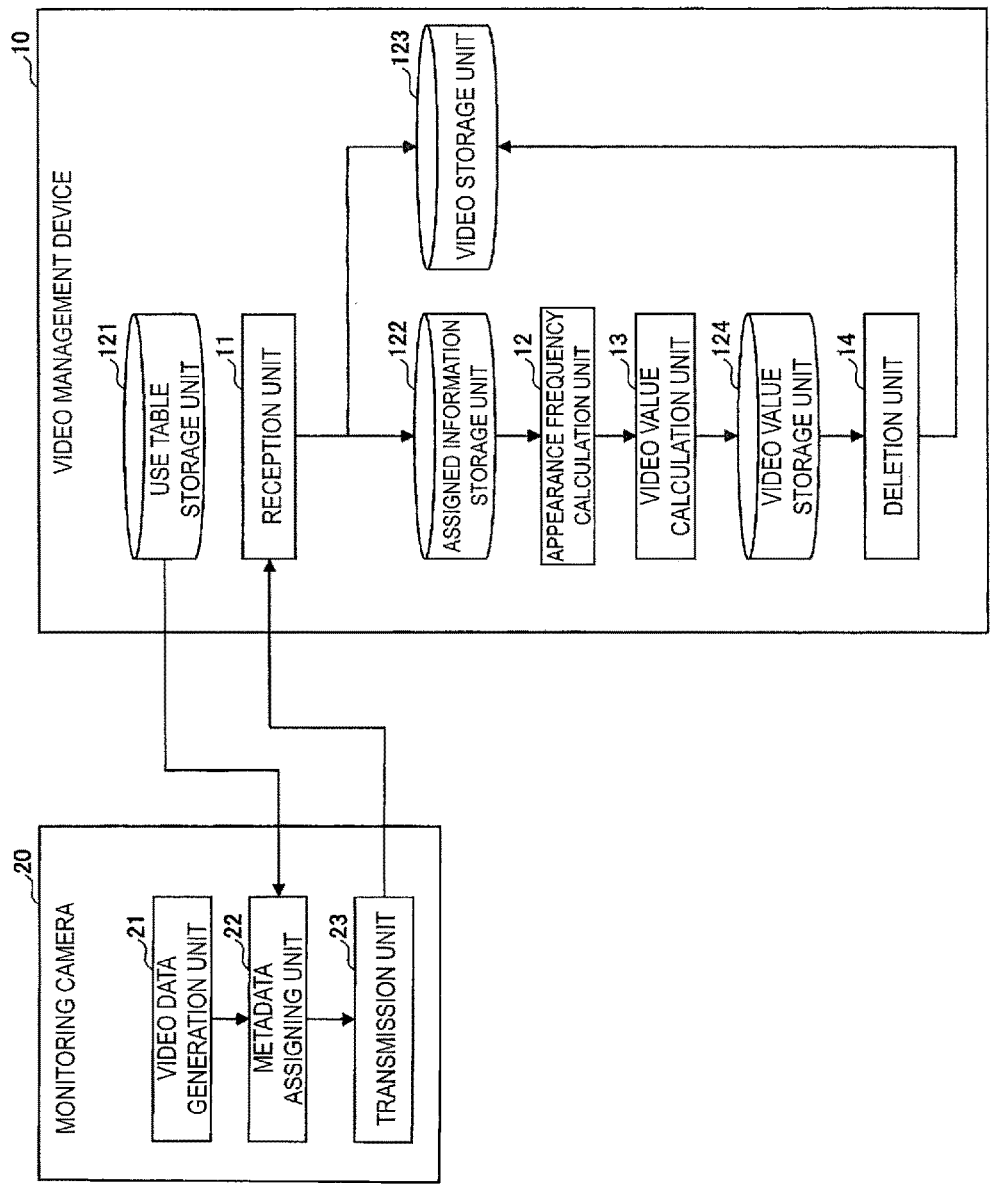
FIG. 4 is a diagram illustrating an example of a functional configuration of the video management system according to the first embodiment.

FIG. 4 is a diagram illustrating an example of a functional configuration of the video management system according to the first embodiment. In FIG. 4, the monitoring camera 20 includes a video data generation unit 21, a metadata assigning unit 22, a transmission unit 23, and the like. These units are realized by a process which one or more programs installed in the monitoring camera 20 cause the CPU of the monitoring camera 20 to execute.

The video data generation unit 21 generates data (hereinafter referred to as "video data") in which videos captured by the monitoring cameras 20 for a predetermined period of time are recorded. For example, the monitoring camera 20 may capture a video with the detection of a moving object or the like as a trigger. In this case, an imaging period of one piece of video data depends on the implementation of a moving object detection function. The video data generation unit 21 assigns identification information of generated video data (hereinafter referred to as a "video ID") and information regarding the imaging of the video data such as a timing of moving object detection to the generated video data. Note that one piece of video data may be a single file (video file).

The metadata assigning unit 22 assigns metadata (attribute data) to each piece of video data. The metadata includes three types of information, that is, information which is static (hereinafter referred to as "static information"), information which is dynamic (hereinafter referred to as "dynamic information"), and combination information. The static information refers to static information that does not depend on the content of a captured video. The dynamic information refers to information that depends on the content of a captured video. "Combination information" refers to information which is determined according to a combination of static information and dynamic information. In the present embodiment, the use (the purpose of use) of video data is an example of combination information. Examples of the use of video data include "viewing," "analysis," and the like. "Viewing" means that the use of video data is viewing (the video data is used for viewing). "Analysis" means that the use of video data is analysis (the video data is used for analysis corresponding to a purpose). However, a configuration of metadata is not limited to the above-described configuration. Note that information including metadata and information assigned to video data by the video data generation unit 21 is referred to as "assigned information" below.

The transmission unit 23 transmits video data having assigned information assigned thereto to the video management device 10.

On the other hand, the video management device 10 includes a reception unit 11, an appearance frequency calculation unit 12, a video value calculation unit 13, a deletion unit 14, and the like. These units are realized by a process which one or more programs installed in the video management device 10. cause the CPU 104 to execute. The video management device 10 also uses a use table storage unit 121, an assigned information storage unit 122, a video storage unit 123, a video value storage unit 124, and the like. These storage units can be realized using, for example, the auxiliary storage device 102, or a storage device capable of being connected to the video management device 10 through a network.

The reception unit 11 receives video data to which assigned information is assigned and which is transmitted by the transmission unit 23. The reception unit 11 stores the assigned information in the assigned information storage unit 122 and stores the video data in the video storage unit 123. The assigned information and the video data are associated with each other on the basis of a video ID of the video data.

The appearance frequency calculation unit 12 calculates the frequency of appearance of a combination for each combination of static information, dynamic information, and combination information (use) included in each piece of metadata stored in the assigned information storage unit 122 (hereinafter referred to as a "combination of metadata"). Note that combination information in the metadata depends on static information and dynamic information. Thus, the combination of metadata is substantially based on the frequency of appearance and a combination of static information and dynamic information.

The video value calculation unit 13 calculates the value of video data (hereinafter referred to as a "video value") for each combination of metadata on the basis of the frequency of appearance. The video value calculation unit 13 stores a video value for each combination of metadata in the video value storage unit 124.

The deletion unit 14 selects video data related to a combination of metadata having a relatively low video value as an object to be deleted, and deletes the selected video data from the video storage unit 123.

The use table storage unit 121 stores a table in which combination information (that is, the use of a video) corresponding to a combination of static information and dynamic information is registered for each combination (hereinafter referred to as a "use table").

Figure 5:
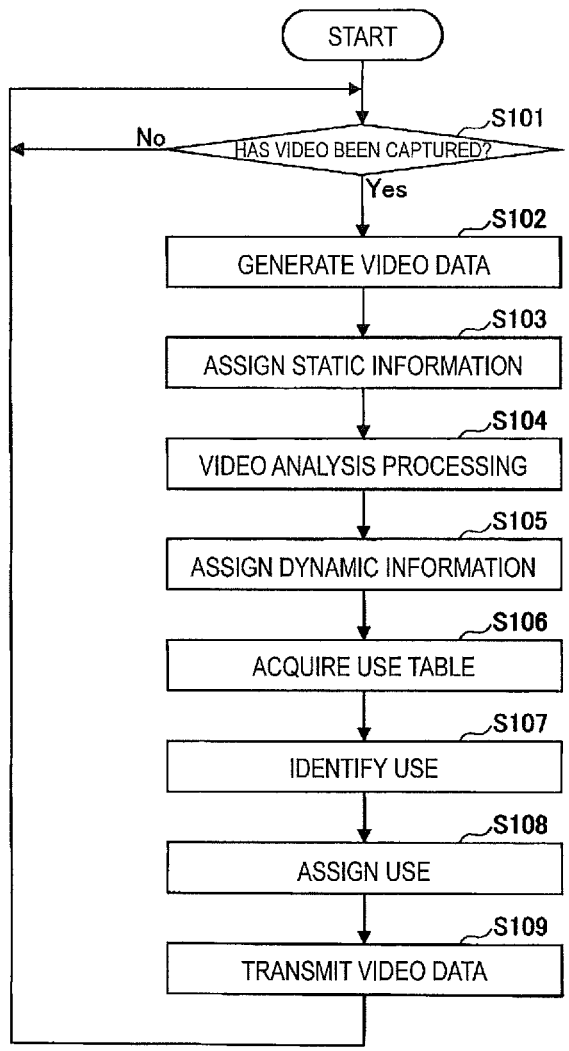
FIG. 5 is a flowchart illustrating an example of a processing procedure executed by a monitoring camera 20 according to the first embodiment.

Hereinafter, a processing procedure which is executed in the video management system 1 will be described. FIG. 5 is a flowchart illustrating an example of a processing procedure which is executed by the monitoring camera 20 according to the first embodiment.

When a video is captured for a predetermined period of time with the detection of a moving object or the like as a trigger (Yes in S101), the video data generation unit 21 generates video data in which a video captured for the predetermined period of time is recorded (hereinafter referred to as "target data") (S102). In this case, the video data generation unit 21 assigns information regarding the imaging of target data such as a video ID, a detection time, a storage starting time, and a storage termination time to the target data. The detection time is the time at which a moving object is detected. The storage starting time is the time at which the storage (recording) of target data is started. The storage termination time is the time at which the storage (recording) of target data is terminated. This information constitutes assigned information together with metadata.

Subsequently, the metadata assigning unit 22 assigns static information to the target data in the information constituting the metadata (S103). For example, information indicating the category (type) of an installation location may be static information. Here, it is assumed that the monitoring camera 20*a* is installed at a convenience store, and the monitoring camera 20*b* is installed at a station. Thus, "convenience store" is assigned, as static information when the target data is video data captured by the monitoring camera 20*a*, and "station" is assigned as static information when the target data is video data captured by the monitoring camera 20*b*.

Subsequently, the metadata assigning unit 22 executes video analysis processing on the target data (S104). The video analysis processing is processing for analyzing the content of a video, and a known technique may be used therefor. For example, characteristics, motions, and the like of a subject may be analyzed. Furthermore, the content of the video analysis processing may vary depending on the category of an installation location of the monitoring camera 20, the purpose of installation of the monitoring camera 20, and the like. That is, the implementation content of video analysis processing may be different for each monitoring camera 20. In the present embodiment, the distinction of sex of a subject (a customer or the like), whether or not a purchase has been made, and the like are analyzed in the monitoring camera 20*a* installed at a convenience store. On the other hand, in the monitoring camera 20*b* installed at a station, what is reflected (for example, a face or the like), whether or not something reflected (a face or the like) is included on a blacklist (for example, a list of persons wanted by the police, or the like), and the like are analyzed.

Subsequently, the metadata assigning unit 22 assigns information obtained through the video analysis processing to the target data as dynamic information (S105). Next, the metadata assigning unit 22 acquires a use table from the use table storage unit 121 of the video management device 10 (S106).

Figures 6, 7:
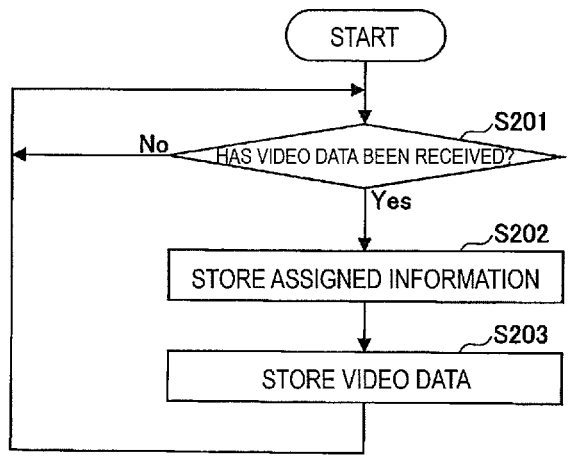
FIG. 6 is a diagram illustrating an example of a configuration of a use table according to the first embodiment.
FIG. 7 is a flowchart illustrating an example of a processing procedure executed by the video management device 10 in response to the reception of video data.

FIG. 6 is a diagram illustrating an example of a configuration of a use table according to the first embodiment. As illustrated in FIG. 6, a use corresponding to a combination of static information and dynamic information is registered for each combination in the use table. Note that, although the use is either "viewing" or "analysis" in the present embodiment, other uses or different uses may be defined.

For example, a first row indicates that a use corresponding to a combination in which static information is "station" and dynamic information is "face (blacklist)" is "viewing." A second row indicates that a use corresponding to a combination in which static information is "station" and dynamic information is "face" is "analysis." A third row indicates that a use corresponding to a combination in which static information is "convenience store" and dynamic information is "man" or "woman" and "purchase" or "no purchase" is "analysis."

Note that the use table may be distributed to the monitoring cameras 20 in advance. In this case, the metadata assigning unit 22 may read the use table stored in the monitoring camera 20 in step S106.

Subsequently, the metadata assigning unit 22 identifies a use corresponding to a combination of static information and dynamic information which is assigned to the target data with reference to the use table (S107). Next, the metadata assigning unit 22 assigns the identified use to the target data (S108).

Subsequently, the transmission unit 23 transmits the target data to which assigned information is assigned to the video management device 10 (S109).

FIG. 7 is a flowchart illustrating an example of a processing procedure executed by the video management device 10 in response to the reception of video data.

When the reception unit 11 receives video data that is transmitted with assigned information assigned thereto in any one monitoring camera 20 (hereinafter referred to as "target data") (Yes in S201), the reception unit 11 stores assigned information assigned to the target data in the assigned information storage unit 122 (S202).

FIG. 8 is a diagram illustrating an example of a configuration of the assigned information storage unit 122 according to the first embodiment. As illustrated in FIG. 8, the assigned information storage unit 122 stores assigned information for each piece of video data received in the past.

Subsequently, the reception unit 11 stores the target data in the video storage unit 123 in association with a video ID of the target data (S203). For example, in a case where the target data is stored in a file system as a file, a video ID may be included in a file name of the file to realize association of the target data and the video ID.

Figures 9, 10:
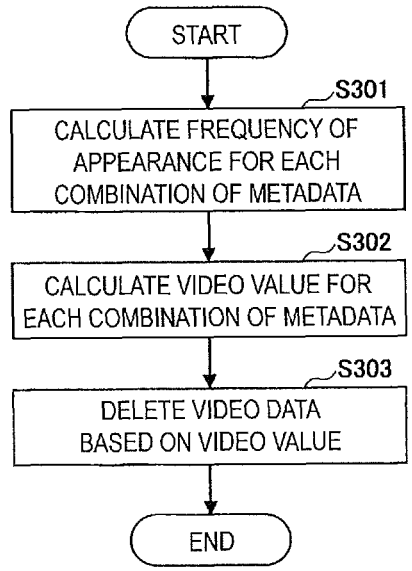
FIG. 9 is a flowchart illustrating an example of a processing procedure of a video value calculation process.
FIG. 10 is a diagram illustrating an example in which a frequency of appearance in a video value storage unit 124 is stored, according to the first embodiment.

FIG. 9 is a flowchart illustrating an example of a processing procedure of a video value calculation process. The processing procedure in FIG. 9 may be executed whenever video data is stored (that is, subsequently to step S203 of FIG. 7) (Case 1). In this case, the amount of calculation increases (a processing load increases), but the video value storage unit 124 can be kept up to date at all times. Alternatively, the processing procedure may be executed at a predetermined timing which is asynchronous with the storage of video data. An example of the predetermined timing is a case where a remaining capacity of the video storage unit 123 is less than a threshold value (Case 2). In this case, the video value storage unit 124 cannot be kept up to date at all times, but it is possible to reduce the amount of calculation (reduce a processing load). Alternatively, the processing procedure may be executed for every fixed period of time (Case 3). In this case, an intermediate state between Case 1 and Case 2 can be obtained for the amount of calculation and the state of the video value storage unit 124.

In step S301, the appearance frequency calculation unit 12 calculates the frequency of appearance of a combination of metadata stored in the assigned information storage unit 122 for each combination and stores calculation results in the video value storage unit 124. In other words, the appearance frequency calculation unit 12 classifies a metadata group stored in the assigned information storage unit 122 into a plurality of groups for each combination of metadata. Note that the classification of the metadata group is equivalent to the classification of a video data group stored in the video storage unit 123. The appearance frequency calculation unit 12 calculates the number of pieces of metadata (that is, the number of appearances) belonging to each group obtained by the classification as the frequency of appearance of a combination of metadata related to each group. Note that the frequency of appearance may not be an absolute value (the number of appearances) or may be a relative value (for example, an appearance rate, an appearance ratio, or the like).

FIG. 10 is a diagram illustrating an example in which the frequency of appearance is stored in the video value storage unit 124 according to the first embodiment. As illustrated in FIG. 10, the video value storage unit 124 is configured to be able to store the frequency of appearance (the number of appearances) and a video value for each combination of metadata. FIG. 10 illustrates an example in which a metadata group illustrated in FIG. 8 is classified into six groups (combinations of metadata), and the frequency of appearance of each group is calculated.

Subsequently, the video value calculation unit 13 calculates a video value for each combination of metadata (that is, for each group classified in step S301) and stores calculation results in the video value storage unit 124 (S302).

Video data having a low frequency of appearance of a combination of metadata is considered to be valuable (high scarcity value) and have a high "video value." This is because a possibility that such video data will be captured again is considered to be low. On the other hand, a possibility that video data having a high frequency of appearance of a combination of metadata will be captured again is considered to be high. Thus, a "video value" of such video data is considered to be low. Consequently, in the present embodiment, a video value is calculated on the basis of the following Equation (1).

$$V = 1/f \tag{1}$$

V: Video value
f: Frequency of appearance of combination of metadata
That is, in the first embodiment, a video value is a reciprocal of a frequency of appearance.

FIG. 11 is a diagram illustrating an example in which a video value is stored in the video value storage unit 124 according to the first embodiment. Note that a larger video value V indicates a higher video value. In addition, a video value V of a combination of metadata indicates a video value V of video data to which metadata related to the combination is assigned.

Subsequently, the deletion unit 14 deletes some video data among the video data stored in the video storage unit 123 on the basis of the video value V (S303). Here, the deletion unit 14 selects an object to be deleted using the video value V as the priority for deletion. That is, the priority of (video data related to) a combination of metadata having a relatively low video value V is increased, and the priority of (video data related to) a combination of metadata having a relatively high video value V is decreased. For example, the deletion unit 14 may select video data related to a combination of metadata up to N-th metadata in a forward direction in ascending order of the video value V as objects to be deleted, and may delete the selected video data. Here, the value of N may be determined on the basis of a free capacity desired to be secured for the video storage unit 123, and the like.

For example, in a case where N=1, video data related to a combination of metadata in a third row in FIG. 11 is an object to be deleted. Note that, in a case where the priority of deletion is determined in accordance with a date and time as disclosed in Non Patent Literature 1, video data having a video ID of "B1" has the highest priority in FIG. 8, but the priority of this video data is lowest in the present embodiment.

Note that step S303 may not necessarily be executed subsequently to step S302. Video data may be deleted asynchronously with the processing procedure in FIG. 9, for example, as in a case where a free capacity of the video storage unit 123 is less than a threshold value.

As described above, according to the first embodiment, it is possible to increase a possibility that the deletion of a high-value video will be avoided.

Next, a second embodiment will be described. Differences from the first embodiment will be described in the second embodiment. Respects that are not particularly mentioned in the second embodiment may be the same as in the first embodiment.

A video value calculation method in the second embodiment is different from that in the first embodiment. Specifically, in the calculation of a video value, the video value is weighted depending on a monetary cost required to use video data determined in accordance with a combination of metadata. That is, weighting is performed such that a video value becomes higher as such a monetary cost becomes lower. This is because the "video value" is considered to be high because the video value can be derived from video data having a low video processing cost required for use (viewing and analysis) even in a state where a monetary cost is low.

Figure 12:
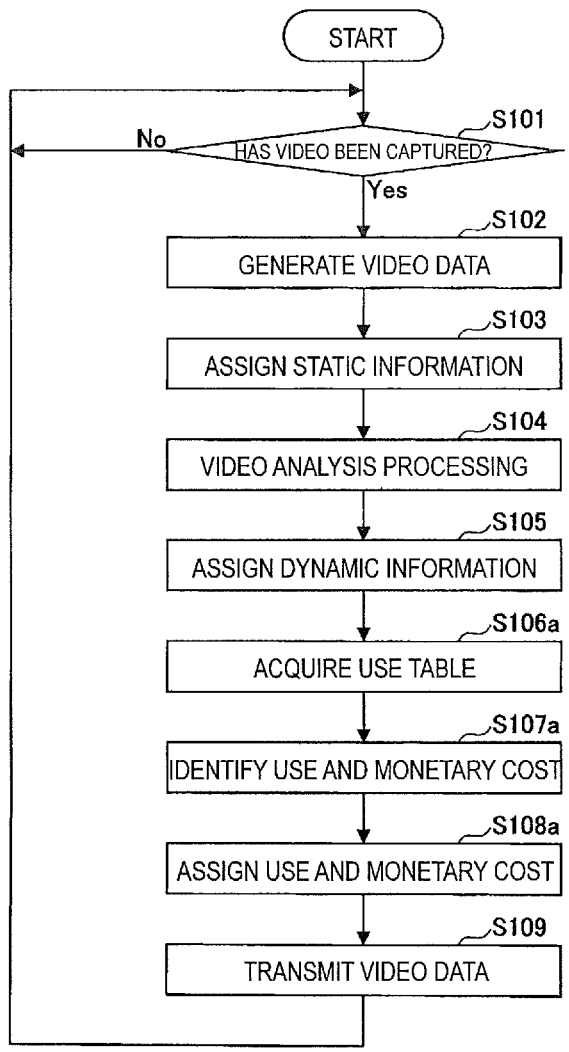
FIG. 12 is a flowchart illustrating an example of a processing procedure executed by a monitoring camera 20 according to a second embodiment.

FIG. 12 is a flowchart illustrating an example of a processing procedure executed by the monitoring camera 20 according to the second embodiment. In FIG. 12, the same steps as those in FIG. 5 are denoted by the same step numbers, and description thereof will be omitted. In FIG. 12, steps S106, S107, and S108 of FIG. 5 are changed to steps S106a, S107a, and S108a.

In the second embodiment, a use table acquired in step S106a is changed as illustrated in FIG. 13.

FIG. 13 is a diagram illustrating an example of a configuration of a use table according to the second embodiment. As illustrated in FIG. 13, in the use table of the second embodiment, a monetary cost for using one piece of video data (hereinafter referred to as a "monetary cost c") is further registered for each combination of static information and dynamic information. Note that the unit of the monetary cost c may not necessarily need to be an amount of money (absolute value). In the present embodiment, a relative value is used as the monetary cost c.

The monetary cost c may be calculated in accordance with c=t'×c', for example, from an average value t' of a use time of a video related to a combination of metadata (a viewing time in the case of viewing, an analysis time in the case of analysis, or the like) and an average value c' of a monetary cost per unit time (hourly pay of a person in the case of viewing, a cost per core of a CPU in the case of analysis, or the like). In FIG. 13, an example of such calculation is illustrated. Alternatively, a monetary cost c may be set statically depending on only a use. For example, a monetary cost c of viewing may be set to 1000, and a monetary cost c of analysis may be set to 1.

In step S107a, the metadata assigning unit 22 identifies a use and a monetary cost c for a combination of static information and dynamic information which is assigned to target data with reference to a use table (S107a). Subsequently, the metadata assigning unit 22 assigns the identified use and monetary cost c to the target data (S108a). That is, in the second embodiment, metadata of video data includes static information, dynamic information, a use, and a monetary cost c.

Thus, in the second embodiment, assigned information stored in the assigned information storage unit 122 is as illustrated in, for example, FIG. 14.

FIG. 14 is a diagram illustrating an example of a configuration of the assigned information storage unit 122 according to the second embodiment. As illustrated in FIG. 14, a monetary cost c is added to metadata in the second embodiment.

In addition, the processing procedure in FIG. 9 is executed on the basis of the assigned information storage unit 122 illustrated in FIG. 14. However, in step S302, the following Equation (2) is used instead of Equation (1).

$$V = 1/(f \times c) \quad (2)$$

V: Video value
c: monetary cost for using one video
f: Frequency of appearance of combination of metadata Thus, in the second embodiment, in step S302 of FIG. 9, the value of a video value is stored in the video value storage unit 124, for example, as illustrated in FIG. 14.

FIG. 15 is a diagram illustrating an example in which a video value is stored in the video value storage unit 124 according to the second embodiment. In FIGS. 15 and 11, the frequencies of appearance of the corresponding rows are the same, but the values of video values are different from each other.

Thus, in step S303 of FIG. 9, the deletion unit 14 may select video data related to a combination of metadata up to N-th metadata in a forward direction, for example, in ascending order of a video value V, as objects to be deleted, and may delete the selected video data.

In the first embodiment, for example, in a case where N=1, video data related to a combination of metadata in a third row in FIG. 14 is an object to be deleted. In the second embodiment, video data related to a combination of metadata in a second row in FIG. 14 is an object to be deleted. Note that, in a case where the priority of deletion is determined in accordance with a date and time as disclosed in Non Patent Literature 1, video data having a video ID of "A1" has the second highest priority in FIG. 14, but the priority of this video data is lowest in the second embodiment.

As described above, according to the second embodiment, a video value can be further determined in consideration of a monetary cost required to use video data.

Note that, in the above-described embodiments, the metadata assigning unit 22 may be included in the video management device 10 instead of each monitoring camera 20. In this case, the metadata assigning unit 22 of the video management device 10 may identify static information such as an installation location of the monitoring camera 20 which is a transmission source of video data on the basis of an IP address of the transmission source of the video data, and the like.

Note that, in the present embodiment, the video storage unit 123 is an example of a storage unit. The reception unit 11 is an example of a storage processing unit. The appearance frequency calculation unit 12 is an example of a calculation unit. The deletion unit 14 is an example of a selection unit.

Although the embodiments of the present disclosure have been described above in detail, the present disclosure is not limited to such specific embodiments, and various modifications or changes can be made within the scope of the gist of the present disclosure described in the claims.

REFERENCE SIGNS LIST

1 Video management system
10 Video management device
11 Reception unit
12 Appearance frequency calculation unit
13 Video value calculation unit
14 Deletion unit
20 Monitoring camera
21 Video data generation unit
22 Metadata assigning unit
23 Transmission unit
100 Drive device
101 Recording medium
102 Auxiliary storage device
103 Memory device
104 CPU
105 Interface device
121 Use table storage unit
122 Assigned information storage unit
123 Video storage unit
124 Video value storage unit
B Bus

The invention claimed is:

1. A video management device comprising:
processing circuitry configured to
store video data received from a plurality of cameras installed at respective imaging locations through a network in a storage unit;
classify a video data group stored in the storage unit according to combinations of the imaging locations, content of video data, and purposes of use of the video data, and calculate a frequency of appearance of each of the combinations; and select video data to be deleted from the storage unit based on the frequency of appearance,
wherein the purposes of use of the video data include viewing and analysis.

2. The video management device according to claim 1, wherein the processing circuitry is further configured to select video data related to the combination in which the frequency of appearance is relatively high.

3. The video management device according to claim 1, wherein the processing circuitry is further configured to select the video data to be deleted from the storage unit based on the frequency of appearance for each combination and a monetary cost required to use the video data determined in accordance with the combination.

4. A video management method comprising:
at a computer,
storing video data received from a plurality of cameras installed at respective imaging locations through a network in a storage unit,
classifying a video data group stored in the storage unit according to combinations of the imaging locations, content of video data, and purposes of use of the video data, and calculating a frequency of appearance of each of the combinations, and
selecting video data to be deleted from the storage unit based on the frequency of appearance,
wherein the purposes of use of the video data include viewing and analysis.

5. The video management method according to claim 4, wherein the selecting of the video data includes selecting video data related to the combination in which the frequency of appearance is relatively high.

6. The video management method according to claim 4, wherein the selecting of the video data includes selecting video data to be deleted from the storage unit based on the frequency of appearance for each combination and a monetary cost required to use the video data determined in accordance with the combination.

7. A non-transitory computer-readable recording medium storing a program causing a computer to execute the video management method according to claim 4.

* * * * *